Patented Mar. 7, 1939

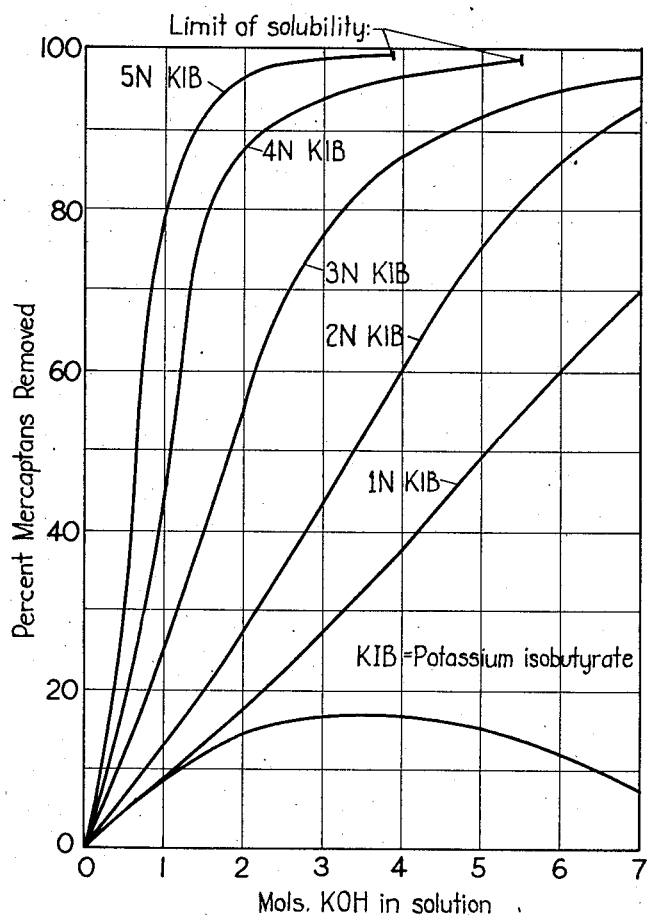

2,149,380

UNITED STATES PATENT OFFICE 2,149,380

PROCESS FOR REMOVING ACID COMPONENTS FROM HYDROCARBON SOLUTIONS

David Louis Yabroff, Berkeley, and Ellis R. White, Albany, Calif., assignors to Shell Development Company, San Francisco, Calif., a corporation of Delaware Application March 15, 1938, Serial No. 196,002

10 Claims. (Cl. 196—30)

This application is a continuation-in-part of our co-pending application Serial No. 118,920, filed January 2, 1937, and deals with the removal of weakly acid reacting organic substances from solutions in certain organic liquids which are substantially immiscible with water, by extraction with aqueous solutions of caustic alkali containing solubility promoters for these substances. More particularly our invention deals with the removal of mercaptans from hydrocarbon distillates.

It is frequently necessary to eliminate small quantities of organic relatively weak acid reacting components such as mercaptans, phenols, thiophenols, etc., from their solutions in neutral or weakly basic reacting organic liquids, which are substantially immiscible with water, such as the liquid hydrocarbons derived from petroleum, benzene, toluene, xylene, substituted normally liquid hydrocarbons which are substantially insoluble in water, for instance, chlorinated hydrocarbons, of which chlorpropane, chlorbutylene, chlorbenzene, brombenzene, are examples; or nitrohydrocarbons, for example, nitroethane, nitrobenzene; or other nitrogen containing hydrocarbons such as amyl or higher amines, aniline, water insoluble pyridine derivatives, petroleum bases, etc. In order that the water insoluble organic liquids may be treated by our process they must be substantially inert and resistant to chemical reaction with strong aqueous solutions of caustic alkali when contacted therewith for short periods of time, e. g., about 10 minutes or less at normal room temperatures.

It is known that weak organic acids which are little soluble in water, i. e., substantially less than about 1% at normal room temperature, or if partly soluble are easily salted out, and which have dissociation constants below those of fatty acids, i. e., below about $10^{-5}$ are difficult to extract from their solutions in water immiscible organic liquids by means of aqueous solutions of caustic alkali.

It is the object of this invention to provide a method whereby acid reacting organic substances of the type hereinbefore described can be removed efficiently and at low cost from solutions in organic water immiscible liquids. As a particular application, it is the object to remove mercaptans from strongly sour gasoline distillates to reduce their sulfur content and to produce sweet or nearly sweet gasolines of improved octane numbers and lead susceptibilities, requiring little after treatment for complete sweetening, if any. Organic acids having dissociation constants greater than about $10^{-5}$ are in general extractable from organic solvents by strong aqueous solutions of alkali metal hydroxides with fair degrees of efficiency, the efficiency normally improving with increasing dissociation constants of the acids. Therefore our improved method is especially useful in connection with the extraction of very weak acids having dissociation constants substantially below about $10^{-5}$, although its usefulness is not necessarily limited thereto.

Our invention comprises extracting such organic acids from their solutions in the organic solvents hereinbefore described with an aqueous solution of a caustic alkali which contains dissolved and added amount of a potassium salt of a fatty acid having from 1 to 6 carbon atoms, under conditions to absorb at least a major portion of the acids in the aqueous solution and to form two layers, and separating the layers.

In our co-pending application Serial No. 118,920, filed January 2, 1937, we have disclosed that alkali metal salts of fatty acids having from 3 to 5 carbon atoms promote the solvent power for weak organic acids of aqueous solutions of caustic alkali in which these salts are dissolved. Now we have found that potassium formate, acetate, and caproate, when dissolved in aqueous solutions of caustic alkali also possess considerable solvent enhancing properties for the weak organic acids in said aqueous solutions, in contrast to the corresponding sodium salts which for all practical purposes are useless, the formate even being detrimental.

The effectiveness of various salts in the matter of solubility promoting depends primarily on two factors: concentration of the salt limited by the solubility in the aqueous caustic alkali solution; and specific solubility promoting effect of the acid radical of the salt. The higher the concentration of a given solubility promoter in the caustic alkali solution, the greater is the solvent power of the latter for the weak organic acids to be extracted, and consequently it is desirable to incorporate into the caustic alkali solution the maximum amount of the solubility promoting salt which can be dissolved and which will not result in operating difficulties, due, for instance, to deposition of solids at some point of the extraction system, or to excessively high viscosities of the salt solution. Thus it is frequently advantageous to use caustic alkali solutions which are substantially saturated with the salts of our invention. Therefore the aqueous solutions of caustic alkali are preferably about 30 to 95% saturated at normal room temperatures with the salts of our invention. Saturation of about 85% has in general proven to be very useful and practical in large scale operation.

The specific solubility promoting effect generally increases with increasing size of the organic radical of the solubility promoting salt, but benefits from this source may be lost due to decreasing solubility of the salt in aqueous caustic alkali. Thus the homologous fatty acids having more than 7 carbon atoms, although possessing favorable specific solubility promoting powers for the organic acids are themselves insufficiently soluble in strong aqueous caustic alkali solutions to be of practical value. Moreover fatty acids of more than 7 carbon atoms such as those having from 10 to 20 carbon atoms tend to create stubborn emulsions between the aqueous and nonaqueous liquids, which are difficult to separate and seriously interfere with the extraction process. The presence of the salts of our invention never causes any emulsion difficulties.

Aside from the specific solvent enhancing effect due to the size of the fatty acid radical and the concentration of the salt in the aqueous solution, the nature of the metal ion appears to have a considerable influence. Of two aqueous solutions containing the same amounts of the same caustic alkali and the same mol concentration of potassium and sodium salts, respectively, of one of the fatty acids of our invention, the solution containing the potassium salt is by far the better solvent.

Due to irregularities in the solubilities with changes in the organic radicals of the fatty acid salts in aqueous solutions of caustic alkali, solvent powers of aqueous solutions saturated to the same degree with different salts, vary between wide limits. This is demonstrated in the table below in which the K value for n-amyl mercaptans between iso-octane and 5N aqueous sodium hydroxide solutions saturated with different salts are given, K being $$K = \frac{\text{concentration of mercaptans in aqueous phase}}{\text{concentration of mercaptans in organic phase}}$$

| Salt | K value at 20° C | |
|---|---|---|
| | Sodium | Potassium |
| Formate | .5 | 10 |
| Acetate | 1.3 | 16 |
| Propionate | 15.5 | 46 |
| n-Butyrate | 16 | 35 |
| Isobutyrate | 140 | 210 |
| n-Valerate | 8 | 14 |
| n-Caproate | 4.5 | 9.2 |

The K value for the 5N sodium hydroxide in the absence of solubility promoters under the above conditions is 1.0.

When dissolved in potassium hydroxide, the potassium salts of our invention are still more effective, as may be seen from the table below, in which the K values are given for n-amyl mercaptan between 6N KOH saturated with the salts and iso-octane.

| Potassium salt | K value at 20° C |
|---|---|
| None | 1.36 |
| Formate | 60 |
| Acetate | 125 |
| Propionate | 108 |
| n-Butyrate | 180 |
| Isobutyrate | 555 |
| n-Valerate | 84 |

Aqueous solutions of various caustic alkalis may be used in our process. The alkali metal hydroxides are the most useful and efficient though weaker bases whose alkalinities are sufficient, however, to form in aqueous solution substantial amounts of salts with the organic acids having dissociation constants below $10^{-5}$, may also be useful and may have special fields of application such as the fractional extraction of mixtures of weak acids having different dissociation constants. Examples of such bases are for instance, ammonia, alkali metal carbonates and borates, tripotassium phosphate, quaternary ammonium bases, etc. Fatty acid salts themselves are insufficiently alkaline for this purpose, the weak acids to be extracted being substantially incapable of displacing the much stronger fatty acids from their salts. In other words the alkalinity of the caustic alkali must be greater than that of the solubility promoting salt.

The extraction powers of the aqueous solutions vary a great deal with the concentration not only of the fatty acid salts but of the caustic alkali as well. This condition is illustrated in the attached drawing in which is plotted percent mercaptan removed from a gasoline by extracting same with 10% by volume of aqueous potassium hydroxide, against concentration of the hydroxide solution for different amounts of potassium isobutyrate contained therein. As will be noted the presence of a relatively small amount of the solubility promoter in a strong caustic alkali solution has a considerable effect, whereas in a weaker caustic alkali solution a much larger amount of the same solubility promoting salt is required to exert a similar effect. For example according to the drawing, 1.5N and 6N aqueous solutions of potassium hydroxide remove about 12% of the mercaptans under the conditions of the experiments. The addition of 2 mols potassium isobutyrate to both solutions, however, has the effect of raising the percent mercaptan removed to 18% for the weaker potassium hydroxide solution and to 89% for the stronger solution. Therefore, as a general rule, we prefer to employ relatively strong solutions of caustic alkali not less than about 1 normal and preferably between about 2 to 10 normal, although weaker solutions are not inoperative.

According to the above the concentration of the solubility promoter required to show a pronounced improvement in the extraction varies with the concentration of the caustic alkali. While we have found no definite rule applying to all conditions by which minimum practical amounts of solubility promoters can be determined without making a series of tests, it may be said that the amount in mols per liter of solubility promoter should not be less than about 2 divided by the number of carbon atoms in the promoter salt, and furthermore the sum of the caustic alkali and solubility promoter in the solution should be at least 4 mols per liter.

A point of interest indicated in the drawing is that the combined effects of the caustic alkali and solubility promoter are far greater than the sum of their individual effects. The following examples serve to illustrate this point more clearly:

Three samples of iso-octane containing dissolved n-amyl mercaptan were shaken with the following three aqueous solutions, and the distribution constants K for the mercaptans between the iso-octane and the solutions were determined:

| Solution in water | K value at 20° C | Percent mercaptan extracted with 10% by vol. aqueous phase |
|---|---|---|
| 3.09N potassium iosbutyrate | .0005 | 0.01 |
| 6N KOH | 1.36 | 11.97 |
| 3.09N potassium iosbutyrate+6N KOH | 384 | 97.4 |

The amounts of aqueous caustic alkali solution containing solubility promoter employed in the extraction are normally above 5 volume percent and for economic reasons seldom exceed 100 volume percent. When extracting mercaptans from hydrocarbon distillates with potassium hydroxide containing potassium isobutyrate for the purpose of sweetening, normally about 10 to 50 volume percent are employed depending upon the boiling range of the hydrocarbon, the type of mercaptans contained therein and the number of extraction stages.

Although the solubilities of the fatty acid salts in the aqueous solutions of caustic alkali increase with increasing temperatures, the application of elevated temperatures for extraction offers few, if any, advantages, because the extraction power of a given caustic alkali solution containing promoter salt, for the weak acids decreases with increasing temperatures. Therefore we usually prefer to operate at temperatures between about 0° to 60° C.

Spent caustic alkali solutions containing the salts of this invention, used in the extraction of mercaptans from solutions in organic water insoluble liquids, can be regenerated readily and efficiently by steaming as described in our copending application Serial No. 174,512, filed November 15, 1937.

The following examples serve further to illustrate our process.

Example I

A California gasoline distillate boiling between about 100° to 150° C. and containing .09% mercaptan sulfur was extracted with 30 volume percent of a 6 normal aqueous KOH solution 85% saturated at 20° C. with potassium isobutyrate, i. e., containing 3.09 mol potassium isobutyrate per liter, in three and six stage countercurrent extractors. The mercaptan sulfur contents were reduced to .00025 and .00005%, respectively, both treated gasolines being sweet. In the absence of potassium isobutyrate under the above conditions the extraction resulted in strongly sour gasoline having a mercaptan sulfur content above .005%.

Example II

A cracked distillate known to contain alkyl phenols was extracted with 5% by volume 40° Bé. KOH and 6N KOH containing 3.0 mol potassium isobutyrate per liter, respectively. To determine the relative alkyl phenol contents in the extracts so obtained, 5 ml. samples of the extracts were acidified and washed with 125 ml. of a reformed unstable gasoline having an induction period of 20 minutes. The liberated alkyl phenols were dissolved in the washed gasolines which were then diluted with 9 times their own volume of the fresh reformed gasoline. The induction periods of the resulting mixtures were then determined. They served as a relative measure of the amount of alkyl phenols contained in the extract samples and also for the relative extraction efficiency of the two extractants. Results were as follows:

| Extractant | Induction period | | Increase in induction period |
|---|---|---|---|
| | Hours | Minutes | Minutes |
| 40° Bé. KOH | 3 | 0 | 160 |
| 6N KOH+3N potassium isobutyrate | 4 | 45 | 265 |

Assuming that the induction period is a straight line function of the amount of alkyl phenols added, an assumption which is essentially correct, it will be seen that the 40° Bé. KOH solution extracted only 60% of the alkyl phenols extracted by the KOH solution containing potassium isobutyrate. It is of interest to note that analytical methods heretofore in use for the determination of alkyl phenols in hydrocarbon oils were based on the assumption that 40° Bé. KOH or NaOH is capable of extracting all the alkyl phenols contained in hydrocarbon oils. Obviously by using in the analytical method KOH substantially saturated with potassium isobutyrate results are obtained which give a much truer picture of the actual content of the alkyl phenols.

Example III

A sour light gasoline boiling below 100° C. and containing essentially methyl and ethyl mercaptans was sweetened by extraction in several stages with 6N KOH solution substantially saturated with potassium acetate. The use of the acetate in the treatment of this particular gasoline was more economical than the use of the isobutyrate, because the former requires considerably less steam for regeneration than the latter.

Example IV

Two samples of benzene containing .0272 mols per liter thiocresol were extracted with 10 volume percent each of 14% aqueous ammonia and 14% aqueous ammonia containing dissolved 400 gm. per liter potassium valerate, respectively. The amounts of thiocresol extracted were 46% and 69%, respectively.

We claim as our invention:

1. In a process of separating organic acids substantially insoluble in water and having dissociation constants below about $10^{-5}$ from an organic water-insoluble liquid in which they are dissolved and which is substantially inert toward aqueous strong bases under the conditions of the process, by extraction with an aqueous solution of a strong base, the improvement comprising extracting said organic liquid with an aqueous solution of a strong base containing dissolved a substantial amount of a potassium salt of a fatty acid having from 1 to 6 carbon atoms per molecule, the alkalinity of the solution being in excess of that of said potassium salt, under conditions to absorb at least a portion of said organic acids in said aqueous solution and to form two liquid layers, one comprising the aqueous solution containing absorbed organic acids, and the other consisting essentially of the organic liquid, and separating the layers.

2. The process of claim 1 in which the strong base is at least 30% saturated at normal room temperature with the fatty acid salt.

3. In a process of separating organic acids substantially insoluble in water and having dissociation constants below about $10^{-5}$ from an organic water-insoluble liquid in which they are dissolved and which is substantially inert toward aqueous strong bases under the conditions of the process, by extraction with an aqueous solution of a strong base, the improvement comprising extracting said organic liquid with an aqueous solution of an alkali metal hydroxide in which is dissolved a substantial amount of a potassium salt of a fatty acid having from 1 to 6 carbon atoms per molecule, under conditions to absorb at least a portion of said organic acids in said aqueous solution and to form two liquid layers, one comprising the aqueous solution containing absorbed organic acids, and the other consisting essentially of the organic liquid, and separating the layers.

4. The process of claim 3 in which the alkali metal hydroxide is potassium hydroxide.

5. The process of claim 3 in which the alkali metal hydroxide is between 1 to 10 normal.

6. The process of claim 3 in which the alkali metal hydroxide solution contains an amount of fatty acid salt in mols per liter equal to at least 2 divided by the number of carbon atoms in the salt, and in which the sum of alkali metal hydroxide and fatty acid salt is at least 4 mols per liter.

7. In the process of separating mercaptans from a hydrocarbon liquid containing same, by extraction with an aqueous solution of a caustic alkali, the improvement comprising extracting said hydrocarbon liquid with an aqueous 1 to 10 normal solution of an alkali metal hydroxide in which is dissolved a potassium fatty acid salt having from 1 to 6 carbon atoms per molecule in an amount in mols per liter equal to at least 2 divided by the number of carbon atoms in the salt, and in which the sum of alkali metal hydroxide and fatty acid salt is at least 4 mols per liter, under conditions to absorb at least a major portion of the mercaptans in the hydroxide solution and to form two layers, one comprising an aqueous alkali metal hydroxide solution containing the potassium fatty acid salt and mercaptides and the other consisting essentially of the hydrocarbon liquid, and separating the layers.

8. In the process of separating mercaptans from a hydrocarbon liquid containing same, by extraction with an aqueous solution of caustic alkali, the improvement comprising extracting said hydrocarbon liquid with a 1 to 10 normal aqueous solution of an alkali metal hydroxide which is 30 to 95% saturated at normal room temperature with potassium isobutyrate, under conditions to absorb at least a major portion of the mercaptans in the hydroxide solution and to form two layers, one comprising an aqueous alkali metal hydroxide solution containing the potassium fatty acid salt and mercaptides and the other consisting essentially of the hydrocarbon liquid, and separating the layers.

9. In the process of separating methyl and ethyl mercaptans from a hydrocarbon liquid containing the same, by extraction with an aqueous solution of caustic alkali, the improvement comprising extracting said hydrocarbon liquid with a 1 to 10 normal aqueous solution of an alkali metal hydroxide which is 30 to 95% saturated at normal room temperature with potassium acetate, under conditions to absorb at least a major portion of the mercaptans in the hydroxide solution and to form two layers, one comprising an aqueous alkali metal hydroxide solution containing the potassium fatty acid salt and mercaptides and the other consisting essentially of the hydrocarbon liquid, and separating the layers.

10. In the process of sweetening a sour hydrocarbon distillate by extracting same with an aqueous solution of a caustic alkali, the improvement comprising extracting said distillate in a countercurrent extractor of at least three stages with 10 to 50 volume percent of a 2 to 10 normal potassium hydroxide solution which is about 85% saturated at normal room temperature with potassium isobutyrate, under conditions to form two layers, one comprising an aqueous solution of potassium hydroxide containing the isobutyrate and mercaptides, and the other consisting of sweetened hydrocarbon distillate, and separating the layers.

DAVID LOUIS YABROFF.
ELLIS R. WHITE.